United States Patent
Santarelli

(10) Patent No.: US 9,201,249 B2
(45) Date of Patent: Dec. 1, 2015

(54) EYEGLASSES

(71) Applicant: FORTUNA URBIS SRL, Rome (IT)

(72) Inventor: Paola Santarelli, Rome (IT)

(73) Assignee: FORTUNA URBIS SRL, Rome (IT)

( * ) Notice: Subject to any disclaimer, the term of this patent is extended or adjusted under 35 U.S.C. 154(b) by 22 days.

(21) Appl. No.: 14/356,276

(22) PCT Filed: Oct. 31, 2012

(86) PCT No.: PCT/IB2012/056045
§ 371 (c)(1),
(2) Date: May 5, 2014

(87) PCT Pub. No.: WO2013/064991
PCT Pub. Date: May 10, 2013

(65) Prior Publication Data
US 2015/0002806 A1    Jan. 1, 2015

(30) Foreign Application Priority Data
Nov. 3, 2011 (EP) ..................................... 11187758

(51) Int. Cl.
*G02C 5/08* (2006.01)
*G02C 5/22* (2006.01)
*G02C 5/00* (2006.01)
(Continued)

(52) U.S. Cl.
CPC .............. *G02C 5/2209* (2013.01); *G02C 5/006* (2013.01); *G02C 5/2263* (2013.01); *G02C 11/00* (2013.01); *G02C 11/04* (2013.01); *G02C 11/10* (2013.01); *G02C 2200/02* (2013.01)

(58) Field of Classification Search
CPC ...... G02C 2200/02; G02C 5/006; G02C 5/08; G02C 5/22; G02C 5/2218
USPC .................... 351/63, 153, 111; 2/454; 16/228
See application file for complete search history.

(56) References Cited

U.S. PATENT DOCUMENTS 6,102,541 A      8/2000  Kuo
6,530,660 B1 *   3/2003  Chao et al. ..................... 351/63
7,566,127 B2 *   7/2009  Breda et al. .................... 351/63

FOREIGN PATENT DOCUMENTS

CN          1462896 A     12/2003
CN       201518084 U      6/2010
(Continued)

OTHER PUBLICATIONS

International Search Report (PCT/ISA/210) and Written Opinion (PCT/ISA/237) for corresponding PCT International Application No. PCT/IB2012/056045 filed on Oct. 31, 2012, completed on Feb. 27, 2013 and mailed on Mar. 27, 2013.

(Continued)

*Primary Examiner* — Hung Dang
(74) *Attorney, Agent, or Firm* — Heslin Rothenberg Farley & Mesiti P.C.; Victor A. Cardona, Esq.

(57) ABSTRACT

Eyeglasses include a front with a pair of lenses and a first arm and a second arm, which are articulated to sides of the front via respective hinges and are able to turn between an extended position and a folded position where they are set the first behind and the second in front of the front. A hinge for articulation of the second arm is connected to the front in such a way that it can turn through 180° about an axis orthogonal to an axis of the hinge. The arms may moreover incorporate a front lighting system and/or a voice-recognition sensor.

9 Claims, 5 Drawing Sheets

(51) Int. Cl.
*G02C 11/00* (2006.01)
*G02C 11/04* (2006.01)

(56) References Cited

FOREIGN PATENT DOCUMENTS

| CN | 201522600 U | 7/2010 |
| CN | 201859274 U | 6/2011 |
| CN | 201955572 U | 8/2011 |
| GB | 1372417 | 10/1974 |
| WO | 2004/019112 A1 | 3/2004 |
| WO | 2005/001550 A2 | 1/2005 |

OTHER PUBLICATIONS

Chinese First Office Action dated Mar. 26, 2015 for Patent Application No. 201280065898.X, with translation.

\* cited by examiner

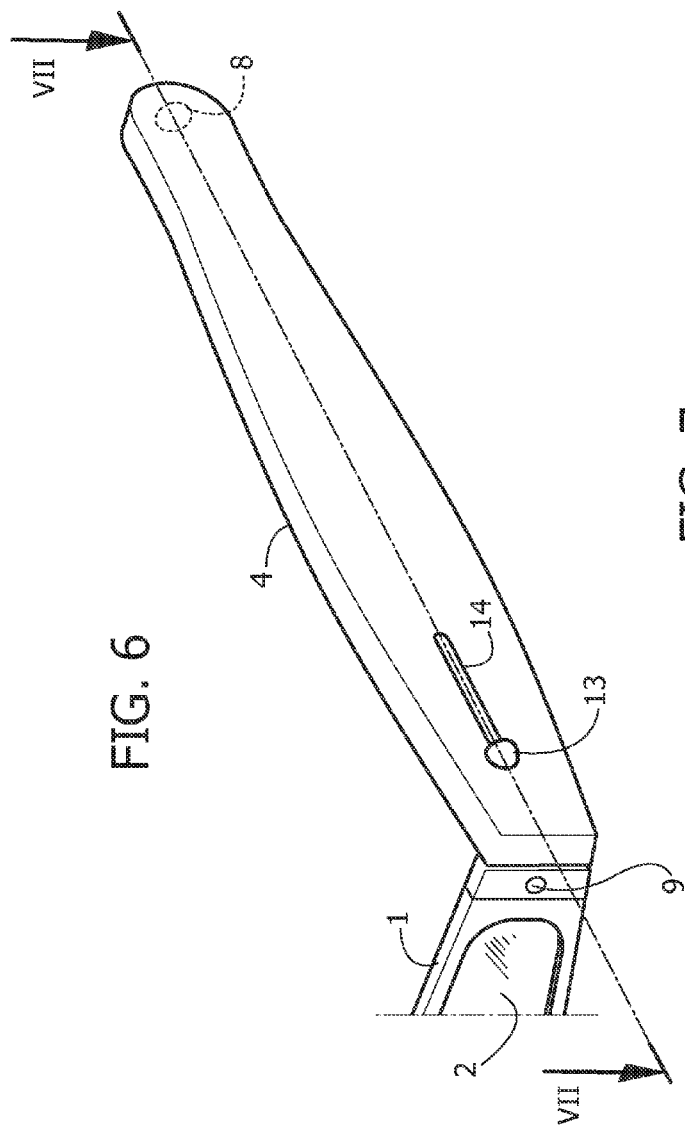
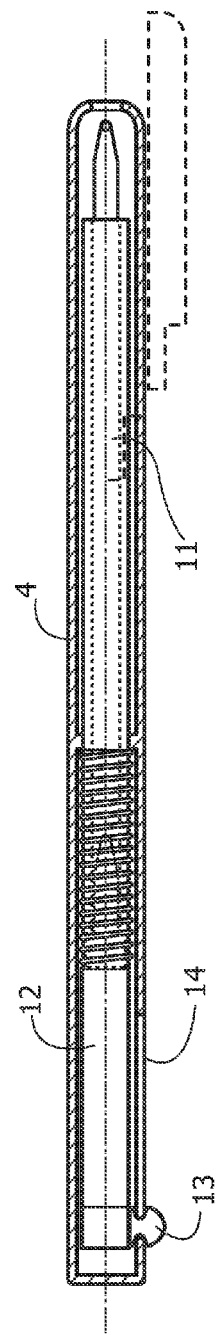
FIG. 6
FIG. 7

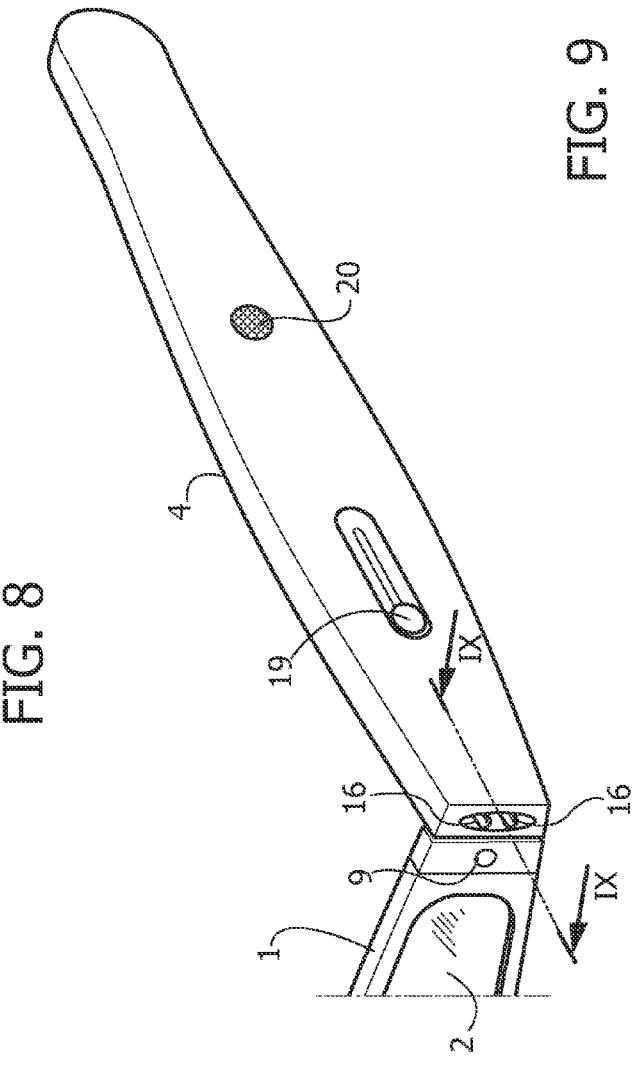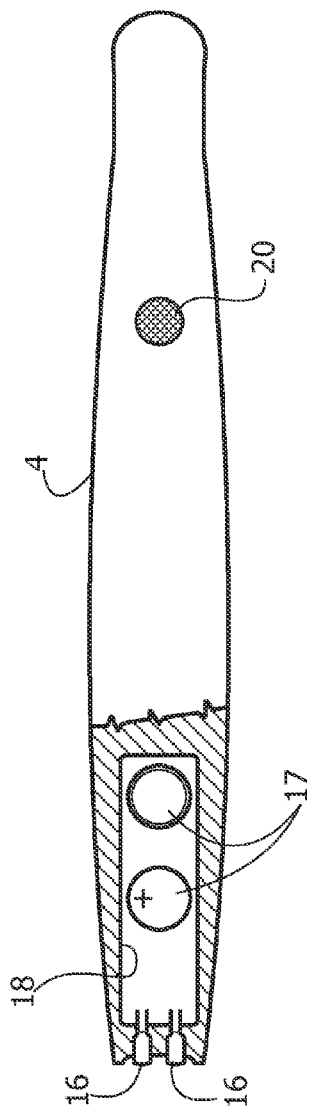

EYEGLASSES

CROSS REFERENCE TO RELATED APPLICATIONS

This application is a national stage of PCT International Application No. PCT/IB2012/056045, flied on Oct. 31, 2012, and published in English on May 10, 2013, as WO 2013/064991 A1, which claims priority from European Application No 11 87758.5 filed on Nov. 3, 2011, the entire disclosures of which are incorporated herein by reference.

This application is also related to co-owned U.S. patent application Ser. No. 14/356,283 filed concurrently herewith on May 5, 2014, also entitled: "EYEGLASSES", which is a national stage of PCT International Application No. PCT/IB2012/056047, filed on Oct. 31, 2012, and published in English on May 10, 2013, as WO 2013/064993 A1, which claims priority from European Application No. 11187743.7, filed on Nov. 3, 2011, the entire disclosure of which is incorporated herein by reference.

This application is also related to co-owned U.S. patent application Ser. No. 14/356,309, filed concurrently herewith on May 5, 2014, also entitled "EYEGLASSES", which is a national stage of PCT International Application No. PCT/IB2012/056049, filed on Oct. 31, 2012, and published in English on May 10, 2013, as WO 2013/064995 A1, which claims priority from European Application No. 11187752.8, filed on Nov. 3, 2011, the entire disclosure of which is incorporated herein by reference.

FIELD OF THE INVENTION

The present invention relates in general to eyeglasses, and more in particular, albeit not exclusively, to eyeglasses of a compact, pocket type and with graduated lenses for reading.

STATE OF THE PRIOR ART

Eyeglasses of the above sort notoriously comprise a front with a pair of lenses, and a first arm and a second arm articulated to the sides of the front via respective hinges. The arms are able to turn between an extended position of use, in which they extend substantially in a direction orthogonal to the front, and a position where they are folded against the front.

Normally, in the folded position the two arms are arranged, set on top of one another, against the dorsal side of the front, so that the front surfaces of the lenses are exposed to the risk of scratching and abrasion that evidently can jeopardize to a greater or lesser extent the degree of transparency thereof.

In order to overcome the above drawback, in the British patent No. GB-1372417 a frame for eyeglasses has been proposed, in which the arms, in the folded position, are arranged one behind and the other in front of the front, to protect the surfaces of the lenses that would otherwise be exposed.

In this known solution the hinge of the arm that is to be folded in front of the front is connected to the front via an intermediate element, in turn articulated to the front about an axis parallel to that of the hinge. In addition to being relatively complicated from the constructional standpoint, this arrangement entails a drawback of an aesthetic nature. The presence of the intermediate element, which obviously is absent on the part of the front corresponding to the other arm, implies a certain asymmetry of shape of the front that is in contrast with the need for a high-class design of eyeglasses.

U.S. Pat. No. 6,102,541 discloses eyeglasses convertible into an eyeglass case in which the hinge for articulation of the arm that is to be folded in front of the front is connected to the front itself in such a way that it can turn through 180° about an axis orthogonal to the axis of the hinge itself.

SUMMARY OF THE INVENTION

The object of the present invention is to provide eyeglasses of the type defined above in which the protection of the lenses in the condition where the arms are folded against the front can be obtained in a way that is simple from a constructional standpoint, at the time same eliminating the aesthetic drawback referred to above.

According to the invention, the above object is achieved thanks to the fact that the front and the free ends of the arms are provided with respective magnetic-coupling members for keeping the arms in the folded position.

In addition, according to a further characteristic, at least one of the arms can incorporate an extractable hand-writing tool and/or a voice-recognition sensor to enable the user to locate his eyeglasses in the case where they happen to get mislaid. Moreover, both of the arms can also be equipped with a front lighting system to enable the user to read in poor lighting conditions.

BRIEF DESCRIPTION OF THE DRAWINGS

The invention will now be described in detail with reference to the annexed drawings, which are provided purely by way of non-limiting example and in which:

FIG. 6 is a perspective view at a larger scale that shows a first variant of one of the arms of the eyeglasses according to the invention; and FIG. 7 is a longitudinal sectional view according to the line VII-VII of FIG. 6;

FIG. 8 is a view similar to that of FIG. 6 that shows a second variant of one of the arms of the eyeglasses according to the invention; and FIG. 9 is a longitudinal sectional view according to the line IX-IX of FIG. 8.

DETAILED DESCRIPTION OF THE INVENTION

It should be noted that the aesthetic configuration of the eyeglasses exemplified in the figures is not to be considered as in any way limiting, but simply as representing one of the multiple embodiments of eyeglasses designed to incorporate the peculiar characteristics of the invention.

Figure 1:
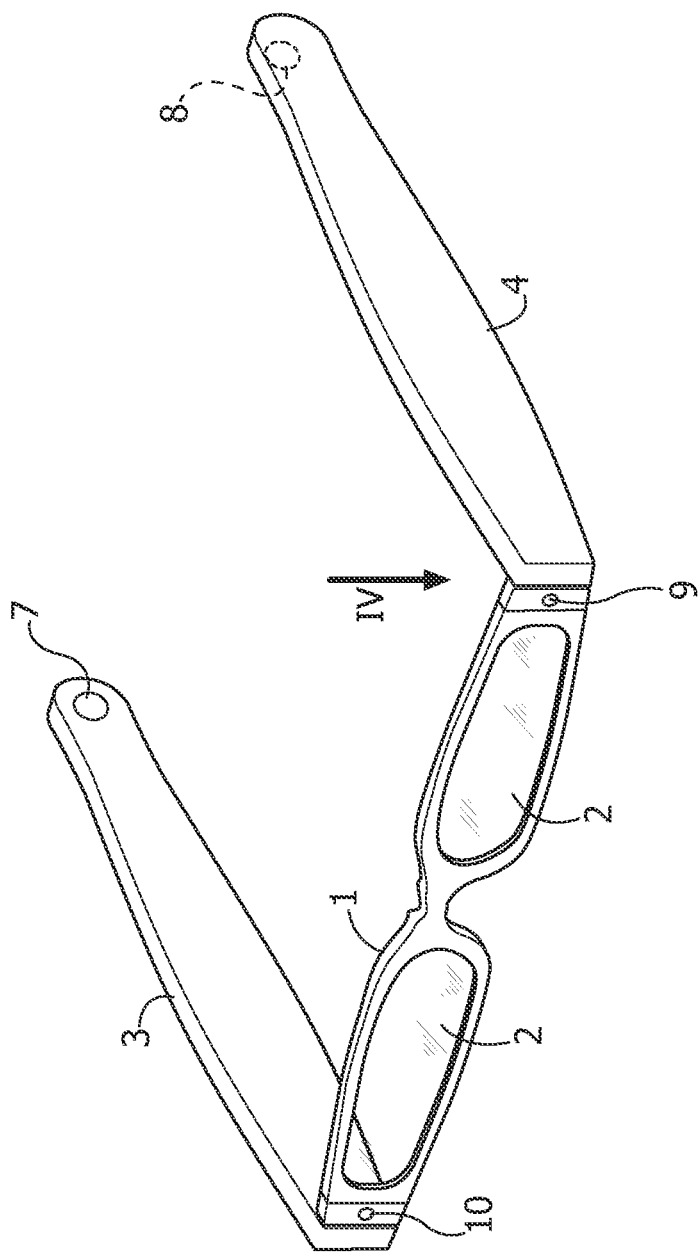
FIG. 1 is a schematic perspective view of an example of embodiment of the eyeglasses according to the invention, represented with the arms in the extended condition.
Figure 4:
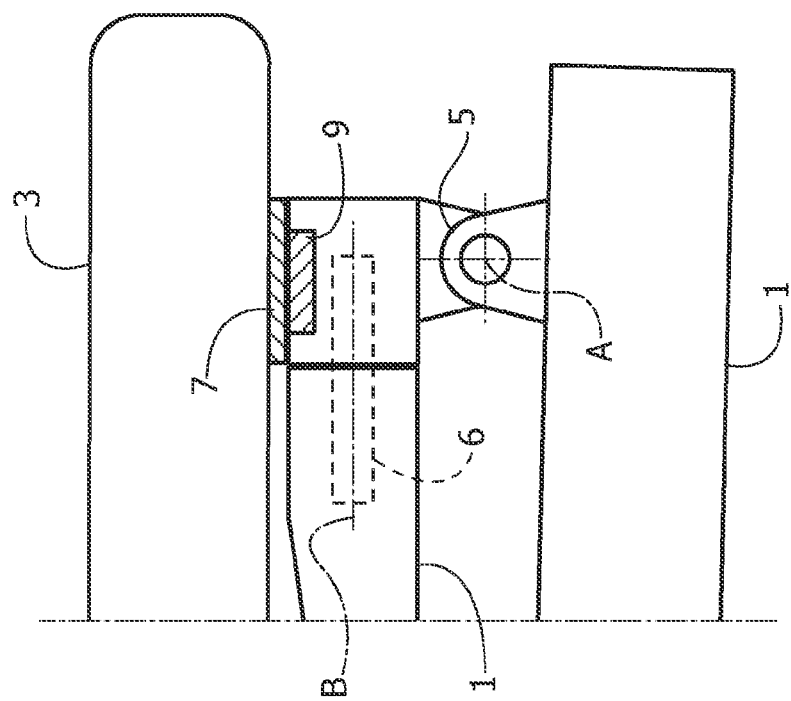
FIG. 4 is a top plan view at a larger scale of the detail indicated by the arrow IV in FIG. 1.
Figure 5:
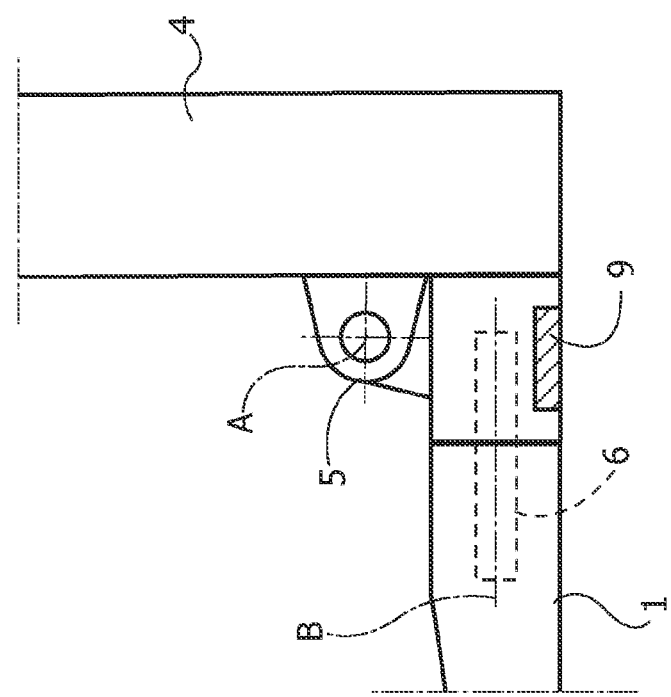
FIG. 5 is a view similar to that of FIG. 4 of the detail indicated by the arrow V in FIG. 3.

With initial reference to FIG. 1, the eyeglasses according to the invention comprise, in a way generally in itself known, a front 1 bearing a pair of lenses 2, and a pair of arms 3, 4 articulated to the sides of the front via respective hinges, of which only the one corresponding to the arm 4 is visible in the drawings and is designated by 5 in FIGS. 4 and 5. The axis of the hinge 5 is designated by A in the same figures: in the spatial position of the eyeglasses as illustrated in the drawings said axis A is oriented vertically.

According to the peculiar characteristic of the invention, the hinge 5 is connected to the front 1, instead of being connected directly as is the case of the hinge corresponding to the arm 3, via a pin for rotation 6 (FIGS. 4 and 5) the axis B of which is oriented in a direction orthogonal to the axis A, i.e., in a direction parallel to the front 1 and, in the spatial position of the eyeglasses represented in the drawings, in a horizontal direction.

The rotation pin 6, in part inserted in the hinge 5 and for the remaining part in the front 1, is invisible from outside.

Figure 2:
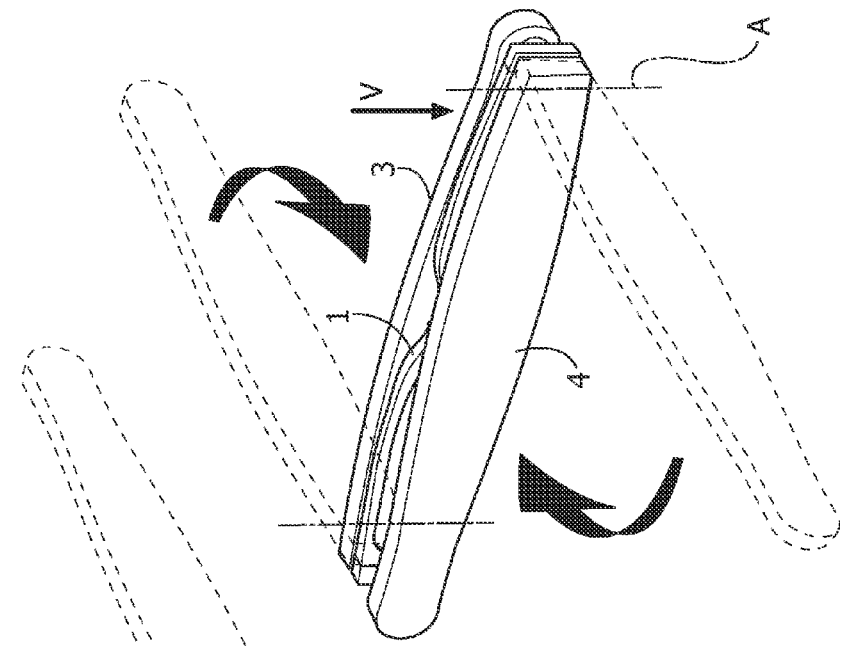
FIG. 2 is a view similar to FIG. 1 that shows the modalities of folding of the arms against the front.
Figure 3:
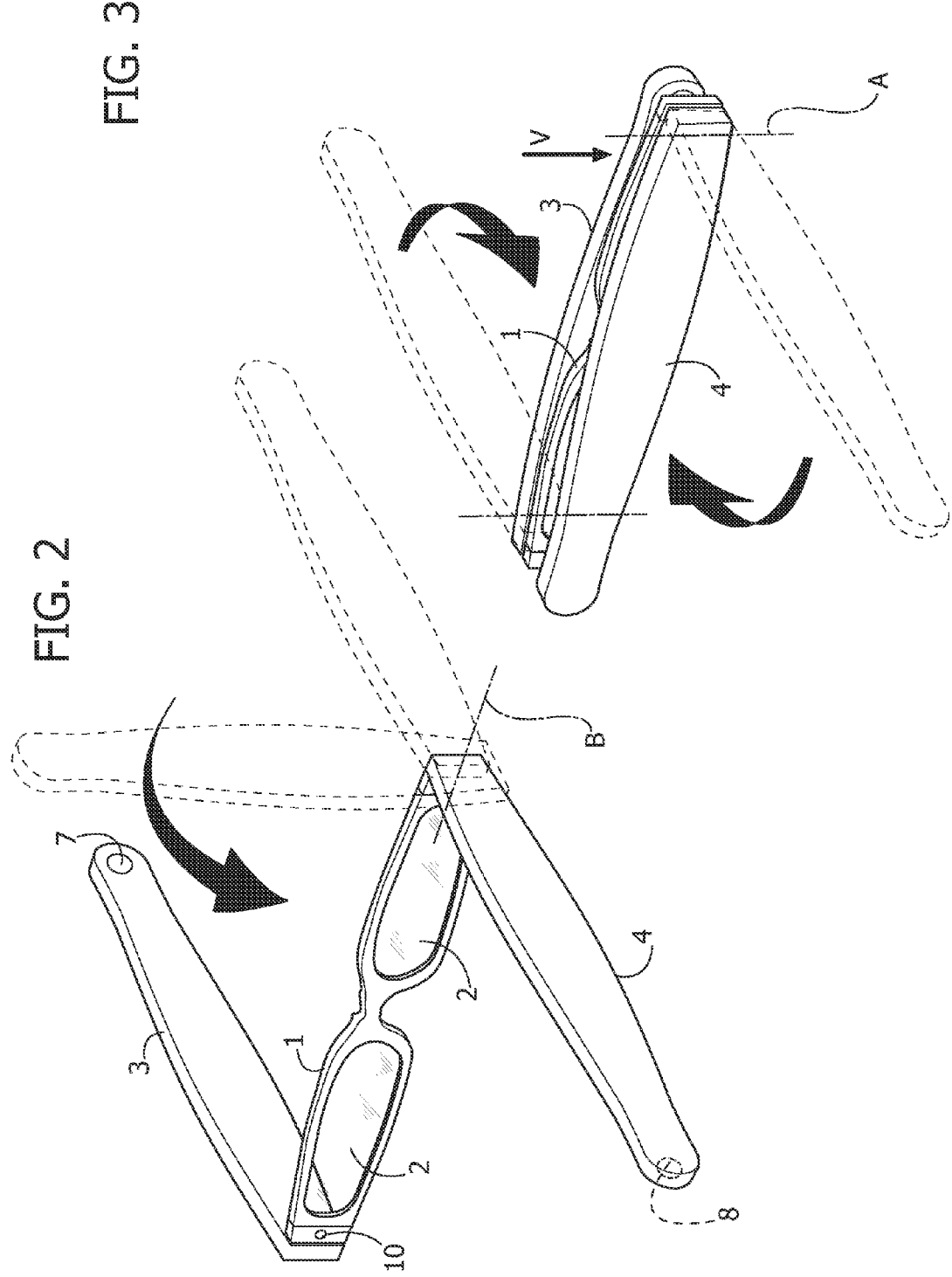
FIG. 3 is a view similar to those of FIGS. 1 and 2 that shows the eyeglasses with the arms folded.

With this arrangement, the arms 3, 4 can be turned between the extended position of use of the eyeglasses represented in FIG. 1, in which they extend substantially in a direction orthogonal to the front 1, and the folded position represented in FIG. 3 and partially in FIG. 5, in which they are set against the front, in a direction parallel thereto, namely, with the arm 3 against the rear side of the front 1 and of the lenses 2, and the arm 4 against their front side. As exemplified in FIG. 2, the displacement of the arm 4 from the extended position to the folded position is obtained in the first place as a result of a rotation thereof through 180° about the axis B of the pin 6, and then as a result of the rotation of the hinge 5 through 90° about the axis A. Folding of the arm 3 is obtained, in a traditional way, as a result of a rotation thereof through 90° about the axis of the corresponding hinge.

In the folded configuration represented in FIG. 3, the lenses 2 are thus protected on both faces by one and the other of the arms 3, 4.

In order to ensure a stable and safe positioning of the arms 3, 4 in the folded configuration the invention envisages, as a further peculiar characteristic, the presence of magnetic-coupling members 7, 8, which are carried by the ends of said arms 3, 4 and are designed to co-operate with corresponding magnetic-coupling members 9, 10, the first of which is carried by the hinge 5 (FIGS. 4 and 5) and the second of which is carried directly by the front 1.

According to a further optional characteristic of the invention, represented in the variant of FIGS. 6 and 7, the arm 4 (and/or the arm 3) is hollow and incorporates inside it a hand-writing tool 11, which can be extracted totally or in part via a spring-operated pusher 12, which can be actuated by means of a slider 13 that is able to slide along a slit 14. Of course, the arrangement of the writing tool 11 and the modality for its activation may differ from those illustrated by way of example.

According to another optional characteristic of the invention, the arms 3, 4 incorporate respective front lighting systems to enable the user to read in poor lighting conditions.

As is illustrated in FIGS. 8 and 9 with reference to the arm 4 (the arrangement is identical for the arm 3), each lighting system comprises a pair of LEDs (light-emitting diodes) 16 applied to the end where the arm 4 is articulated to the front 1, arranged and oriented so as to generate a relatively wide light beam. The LEDs 16 are supplied by one or more batteries 17, conveniently of the lithium-ion rechargeable type, housed within a seat 18 of the arm 4. The LEDs 16 can be activated by means of a switch 19, for example of the sliding type designed to enable adjustment of the light intensity emitted.

The two pairs of LEDs 16 are conveniently housed within respective recesses having a conical or curved shape, treated so as to present a highly reflecting surface in order to maximize light emission.

In addition, the arm 4 (and possibly also the arm 3) can incorporate a voice-recognition sensor 20, of a type in itself known, to enable the user to locate his eyeglasses in the case where they happen to get mislaid.

Of course, the details of construction and the embodiments may vary widely with respect to what has been described and illustrated herein, without thereby departing from the scope of the present invention as defined in the ensuing claims.

The invention claimed is:

1. Eyeglasses comprising:
a front with a pair of lenses and a first arm and a second arm, which are articulated to the sides of the front via respective hinges and are able to turn between an extended position, in which they extend substantially in a direction orthogonal to the front, and a position where they are folded against the front, in which in the folded position the arms are arranged such that the first arm is behind and the second arm is in front of the front; and
wherein a hinge of said hinges for articulation of the second arm is connected to the front in such a way that can turn through 180° about an axis orthogonal to an axis of said hinge, wherein the front and free ends of the arms are provided with respective magnetic-coupling members for keeping the arms in the folded position.

2. The eyeglasses according to claim 1, wherein said first arm or said second arm incorporates an extractable handwriting tool.

3. The eyeglasses according to claim 2, wherein each arm comprises a respective front lighting source.

4. The eyeglasses according to claim 2, wherein said first arm or said second arm comprises a voice-recognition sensor.

5. The eyeglasses according to claim 1, wherein each arm of said first arm and said second arm comprises a respective front lighting source.

6. The eyeglasses according to claim 5, wherein said front lighting source includes a pair of LEDs applied to an end of each arm where each arm is articulated to the front and supplied by one or more batteries, incorporated in each arm, via a regulation switch.

7. The eyeglasses according to claim 6, wherein said first arm or said second arm comprises a voice-recognition sensor.

8. The eyeglasses according to claim 5, wherein said, first arm or said second arm comprises a voice-recognition sensor.

9. The eyeglasses according to claim 1, wherein said first arm or said second arm comprises a voice-recognition sensor.

* * * * *